US008619043B2

(12) United States Patent
Griffin et al.

(10) Patent No.: US 8,619,043 B2
(45) Date of Patent: Dec. 31, 2013

(54) SYSTEM AND METHOD OF CALIBRATION OF A TOUCH SCREEN DISPLAY

(75) Inventors: Jason Tyler Griffin, Waterloo (CA); David James Mak-Fan, Waterloo (CA)

(73) Assignee: Blackberry Limited, Waterloo (CA)

( * ) Notice: Subject to any disclaimer, the term of this patent is extended or adjusted under 35 U.S.C. 154(b) by 695 days.

(21) Appl. No.: 12/394,927

(22) Filed: Feb. 27, 2009

(65) Prior Publication Data

US 2010/0220064 A1 Sep. 2, 2010

(51) Int. Cl.
*G06F 3/041* (2006.01)

(52) U.S. Cl.
USPC .......................................................... 345/173

(58) Field of Classification Search
None
See application file for complete search history.

(56) References Cited

U.S. PATENT DOCUMENTS

| 2003/0210235 A1* | 11/2003 | Roberts .......................... 345/173 |
| 2005/0174333 A1* | 8/2005 | Robinson et al. .............. 345/168 |
| 2007/0040813 A1* | 2/2007 | Kushler et al. ................. 345/173 |
| 2007/0070046 A1* | 3/2007 | Sheynblat et al. ............. 345/173 |
| 2008/0100586 A1 | 5/2008 | Smart |
| 2008/0120129 A1* | 5/2008 | Seubert et al. .................... 705/1 |
| 2008/0289887 A1* | 11/2008 | Flint et al. .................... 178/18.03 |
| 2009/0325686 A1* | 12/2009 | Davis et al. ...................... 463/25 |
| 2010/0194692 A1* | 8/2010 | Orr et al. ........................ 345/173 |

FOREIGN PATENT DOCUMENTS

| JP | 11-161427 A | 6/1999 |
| JP | 2002-149348 A | 5/2002 |
| JP | 2004-54413 A | 2/2004 |
| KR | 10-2008-0103327 A | 11/2008 |
| TW | 200521813 | 7/2005 |
| WO | 03/049002 A2 | 6/2003 |

OTHER PUBLICATIONS

Notice of Decision for Patent dated Apr. 29, 2011, issued from the corresponding Korean patent application No. 10-2010-0012456.
European Patent Application No. 09154044.3, Search Report dated Jun. 30, 2009.
English translation of Office Action dated Jul. 31, 2013, issued in respect of corresponding Taiwanese Patent Application No. 099101381.

* cited by examiner

*Primary Examiner* — Adam R Giesy
*Assistant Examiner* — Henok Heyi
(74) *Attorney, Agent, or Firm* — Geoffrey deKleine; Borden Ladner Gervais LLP

(57) ABSTRACT

A touch screen display of an electronic device is calibrated. The method includes receiving input comprising selections of features registered at the touch screen display, filtering the input based on characteristics determined during the receiving to determine if the input is to be used for calibrating, for each input used for calibrating, determining a difference between registered touch location and a respective target for the selection and subtracting an offset from the difference, thereby providing remainders of differences for the selections, and calibrating by adjusting a prior calibration based on the remainders if the input is determined to be used for calibrating.

15 Claims, 6 Drawing Sheets

SYSTEM AND METHOD OF CALIBRATION OF A TOUCH SCREEN DISPLAY

FIELD OF TECHNOLOGY

The present disclosure relates to calibration of a touch screen display at an electronic device.

BACKGROUND

Electronic devices, including portable electronic devices, have gained widespread use and provide a variety of functions including, for example, telephonic, electronic messaging, and other personal information manager (PIM) application functions. Portable electronic devices include, for example several types of mobile stations such as simple cellular telephones, smart telephones, wireless PDAs, and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Devices such as PDAs or smart telephones are generally intended for handheld use and ease of portability. Smaller devices are generally desirable for portability and touch screen devices constructed of a display, such as a liquid crystal display, with a touch-sensitive overlay are useful on such handheld devices that are small and are therefore limited in space available for user input and output devices.

Touch screen displays such as resistive touch screen displays suffer from disadvantages as such displays require adjustments to calibration to ensure accuracy and compensate for drift in accuracy over time. Such calibration (or recalibration) may be tedious, and the user may not immediately recognize shifts in accuracy for which calibration is desirable.

Improvements in calibration of touch screen displays at electronic devices are therefore desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
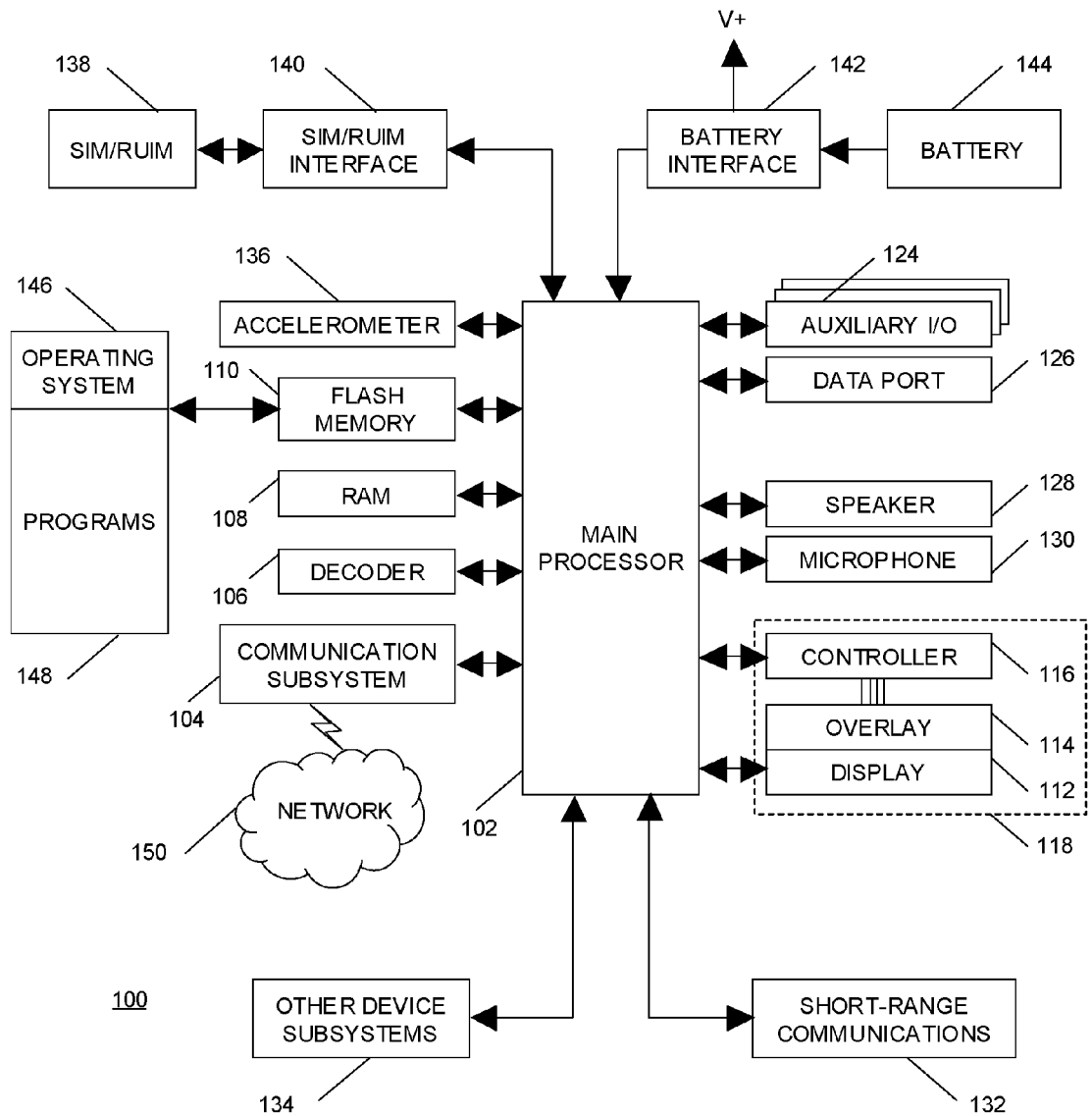
FIG. 1 is a simplified block diagram of components including internal components of a portable electronic device according to an aspect of an embodiment.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, and wirelessly enabled notebook computers. The portable electronic device may also be a portable electronic device without wireless communication capabilities such as a handheld electronic game device, digital photograph album, digital camera or other device.

Referring to FIG. 1, a block diagram of an example of an embodiment of a portable electronic device 100 is provided. The portable electronic device 100 includes a number of components such as the processor 102 that controls the overall operation of the portable electronic device 100. Communication functions, including data and voice communications, are performed through a communication subsystem 104. Data received by the portable electronic device 100 may be decompressed and decrypted by a decoder 106. The communication subsystem 104 receives messages from and sends messages to a wireless network 150.

The processor 102 also interacts with additional subsystems such as a Random Access Memory (RAM) 108, a flash memory 110, a display 112 with a touch-sensitive overlay 118 connected to an electronic controller 116 that together make up a touch-sensitive display 118, an auxiliary input/output (I/O) subsystem 124, a data port 126, a speaker 128, a microphone 130, short-range communications 132 and other device subsystems 134. The processor 102 interacts with the touch-sensitive overlay 118 via the electronic controller 116. The processor 102 may also interact with an accelerometer 136 as shown in FIG. 1.

To identify a subscriber for network access according to the present embodiment, the portable electronic device 100 uses a Subscriber Identity Module (SIM) or Removable User Identity Module (RUIM) card 138 inserted into a SIM/RUIM interface 140 for communication with a network such as the network 150. Alternatively, user identification information may be programmed into the flash memory 110.

The portable electronic device 100 is a battery-powered device and includes a battery interface 142 for receiving one or more rechargeable batteries 144.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

Figure 2:
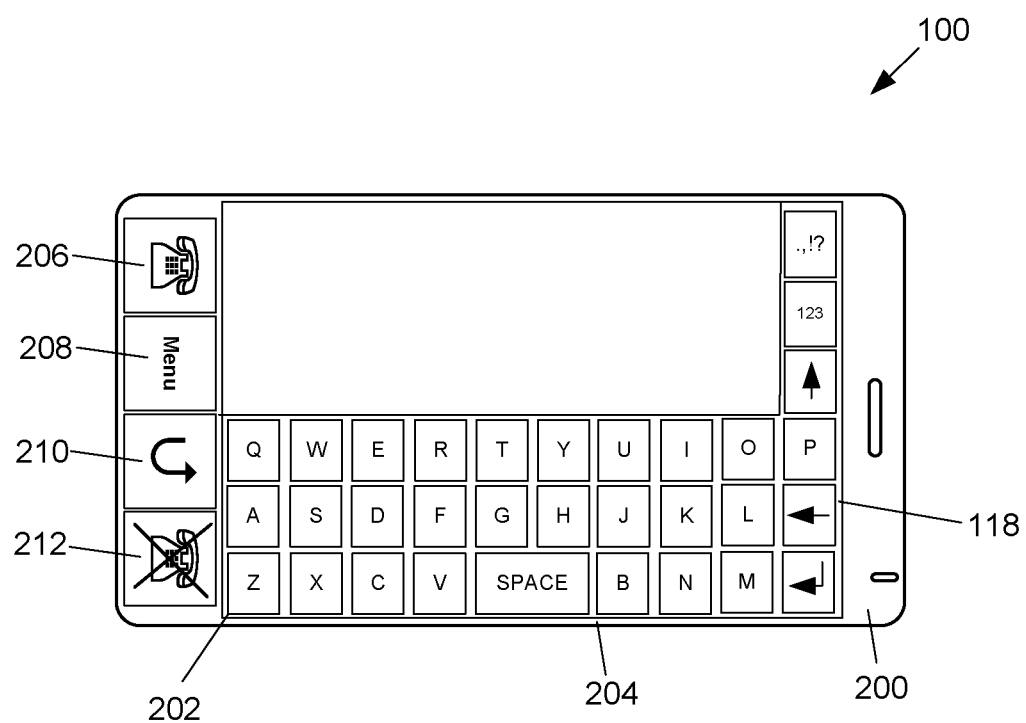
FIG. 2 is a front view of an example of a portable electronic device shown in a landscape orientation.

Reference is now made to FIG. 2, which shows a front view of an example of a portable electronic device 100 in landscape orientation. The portable electronic device 100 includes a housing 200 that houses the internal components that are shown in FIG. 1 and frames the touch screen display 118 such that the touch screen display 118 is exposed for user-interaction therewith when the portable electronic device 100 is in use. In the example orientation shown in FIG. 2, the touch screen display 118 includes a graphical user interface that in the present example includes a landscape mode virtual keyboard 202 for user input of data in the form of, for example, alphanumeric characters or symbols during operation of the portable electronic device 100. The present disclosure is not limited to the landscape mode virtual keyboard 202 shown as other keyboards including other full keyboards or reduced keyboards are possible.

The housing 200 may be any suitable housing for the internal components shown in FIG. 1. The housing 200 in the present example includes a frame 204 that borders the touch screen display 118. The housing 200 also includes sidewalls (not shown) that extend between the frame 204 a back (not shown). The back may be any suitable may include a plate that is releasably attached for insertion and removal of, for example, the battery 144 and the SIM/RUIM card 138 described above. The housing may be injection molded. In the example of the portable electronic device 100 shown in FIG. 2, the frame 204 is generally rectangular with rounded corners, although other shapes are possible.

The touch screen display 118 may be a resistive touch screen display. A resistive touch screen display 118 includes the display 112 and a touch-sensitive overlay 114 in the form of a resistive touch-sensitive overlay 114. The resistive touch-sensitive overlay 114 includes a number of layers in a stack and is fixed to the display 112 via a suitable optically-clear adhesive. These layers include: a rigid substrate of suitable material, such as glass or acrylic; an inner touch sensor layer that includes a resistive circuit layer with a conductive coating of suitable material such as Indium Tin Oxide (ITO); an outer touch sensor layer that also includes a resistive circuit layer with a conductive coating of suitable material such as ITO; and a protective cover, such as a polyester film. The inner touch sensor layer may be deposited on the rigid substrate while the outer touch sensor layer may be deposited on the protective cover. The inner touch sensor layer and outer touch sensor layer are separated by an air gap and insulating dots. The outer touch sensor layer and the protective cover are flexible for flexing to cause contact between the two ITO coatings when a force is applied to the protective cover of the touch screen display 118 by, for example, a user pressing on the protective cover.

When pressed by a finger or a stylus, for example, the outer touch sensor layer contacts the inner touch sensor layer and the X and Y location of the contact between the inner touch sensor layer and the outer touch sensor layer may be determined, thereby determining the X and Y location of the touch on the touch screen display 118. The resistive touch screen display 118 may be any suitable resistive touch screen display. One example of a suitable resistive touch screen display is a 5-wire resistive touch screen display in which a differential voltage is applied across the inner touch sensor layer via opposing x bus bars and the voltage at the point of contact is measured by the outer touch sensor layer via a bus bar. A differential voltage is applied across the inner touch sensor layer via the y bus bars, perpendicular to the x bus bars, and the voltage at the point of contact is measured by the outer touch sensor layer via the bus bar. The position of contact between the inner touch sensor layer and outer touch sensor layer and thus, the position of touch of the finger or stylus, is determined based on the measured voltages. The controller 116 drives the voltage applied to the inner touch sensor layer in five wire example and receives the voltages from the outer touch sensor layer for determination of the position of touch by the processor 102.

The touch screen display 118 may be initially calibrated during the manufacture of the portable electronic device 100 and/or may be calibrated using a suitable initial calibration routine in which a user is prompted to touch at certain locations on the touch screen display 118, for example. Resistive touch screen displays 38 may also require recalibration as result of drift in calibration and therefore reduction in accuracy over time. Calibration of the touch screen display 118 to correct for drift over time is described below with reference to FIG. 3.

Referring again to FIG. 2, a user's touch on the touch screen display 118 is established by determining the X and Y touch location and user-selected input is determined based on the X and Y touch location and the application executed by the processor 102. In the example of the screen shown in the front view of FIG. 2, the application provides the virtual keyboard 202 and the X and Y touch location is matched to the button of the virtual keyboard 202 selected by the user. Thus, the button selected by the user is determined based on the X and Y touch location and the application. In the example shown in FIG. 2, the user may enter alphanumeric characters or symbols via the virtual keyboard 202, selecting characters from the virtual keyboard 202 by touching the touch screen display 118 at the location of the characters on the virtual keyboard 202.

In the present example, the portable electronic device includes four physical buttons 206, 208, 210, 212 in the housing 200 for user-selection for performing functions or operations when selected. The remainder of the buttons shown on the face of the example of the portable electronic device of FIG. 2 are virtual buttons of the virtual keyboard 202 on the touch screen display 118.

Figure 5:
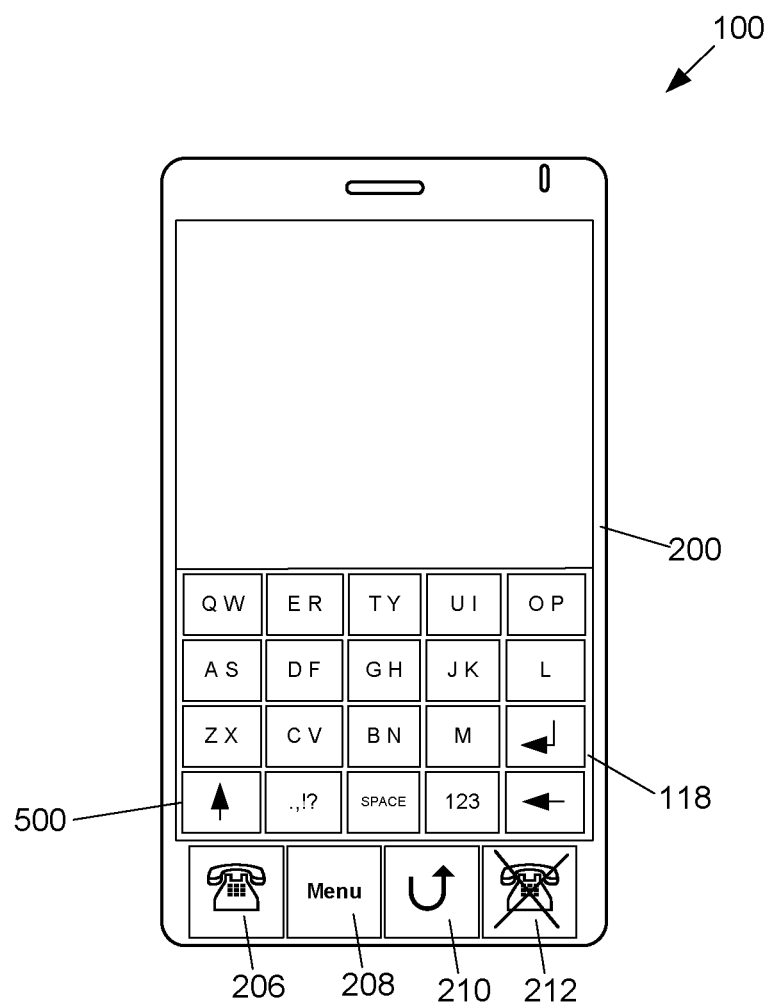
FIG. 5 is a front view of the example of the portable electronic device of FIG. 2 shown in a portrait orientation.

As indicated above, the accelerometer 136 is used for detecting direction of gravitational forces (or gravity-induced reaction forces). Movement of the portable electronic device 100 to alternate orientations is detected and the orientation of the accelerometer 136 and therefore of the portable electronic device 100 may be determined and an associated signal may be provided to the application running at the time the movement to the alternate orientation is detected. Thus, a rotation from landscape orientation as shown in FIG. 2 to portrait orientation as shown in FIG. 5 may be detected and a signal is provided to the application running at the time the movement is detected. Similarly, a rotation from portrait orientation as shown in FIG. 5 to landscape orientation as shown in FIG. 2 may be detected and a signal provided to the application running at the time the movement is detected. In applications where a keyboard is provided, the keyboard that is provided is dependent on the orientation of the portable electronic device 100 so that the landscape mode virtual keyboard is provided when the portable electronic device 100 is in the landscape orientation. Similarly, a portrait mode keyboard is provided when the portable electronic device 100 is a portrait orientation.

Figure 3:
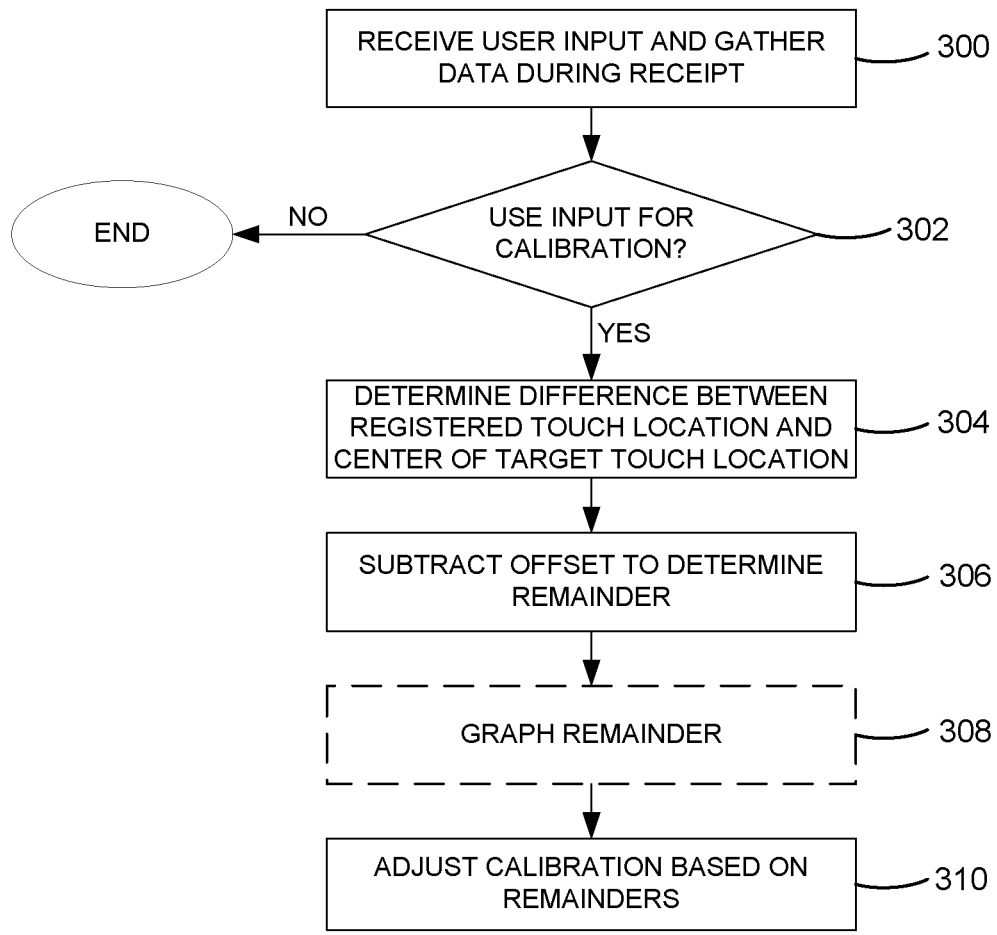
FIG. 3 is a flow chart illustrating a method of calibrating a touch screen display at an electronic device.

As indicated above, the touch screen display 118 may be calibrated to correct for drift over time. The touch screen display 118 may be calibrated as shown in FIG. 3. The steps of FIG. 3 are carried out by routines or subroutines of software executed by the processor 102. Coding of software for carrying out such steps is well within the scope of a person of ordinary skill in the art given the present description.

The processor 102 may enter a calibration routine at any suitable time in any suitable application. For example, the processor 102 may enter the calibration routine when input is received from a virtual keyboard on the touch screen display 118. The input is received 300 at the processor 102 in the form of user-selections via the touch-sensitive overlay 114 and the controller 116 and data is gathered during receipt of the input. The received input is filtered 302 to find input that is likely to be reliable in determining calibration errors. If the input is not used for calibration, the process ends. If, on the other hand, the input is used for calibration, the process continues with step 304, where a difference between the registered touch location and center of the target touch location for each of the user selections is determined 304. The target location may be determined, for example, by user corrections of selected letters, icons, and so forth, word selections from pop-up menus, difference between the point and the center of the virtual key or icon selected. The processor estimates the likely intended target based on proximity of the registered touch location and the center of the target touch location. The difference is a result of both an offset and a shift. The offset is the difference between the center of the target touch location and the registered touch location when the portable electronic device 100 is calibrated and there is no calibration shift. The shift is a difference between the actual touch location on the touch screen display 118 and the registered touch location on the touch screen display 118, or a calibration shift. An appropriate offset is subtracted 306 from each determined difference to leave a remainder of the difference that is attributed to the shift. Each remainder is optionally graphed 308 to provide a distribution curve of a plurality of remainders. The calibration is adjusted 310 based on the plurality of remainders.

Figure 4:
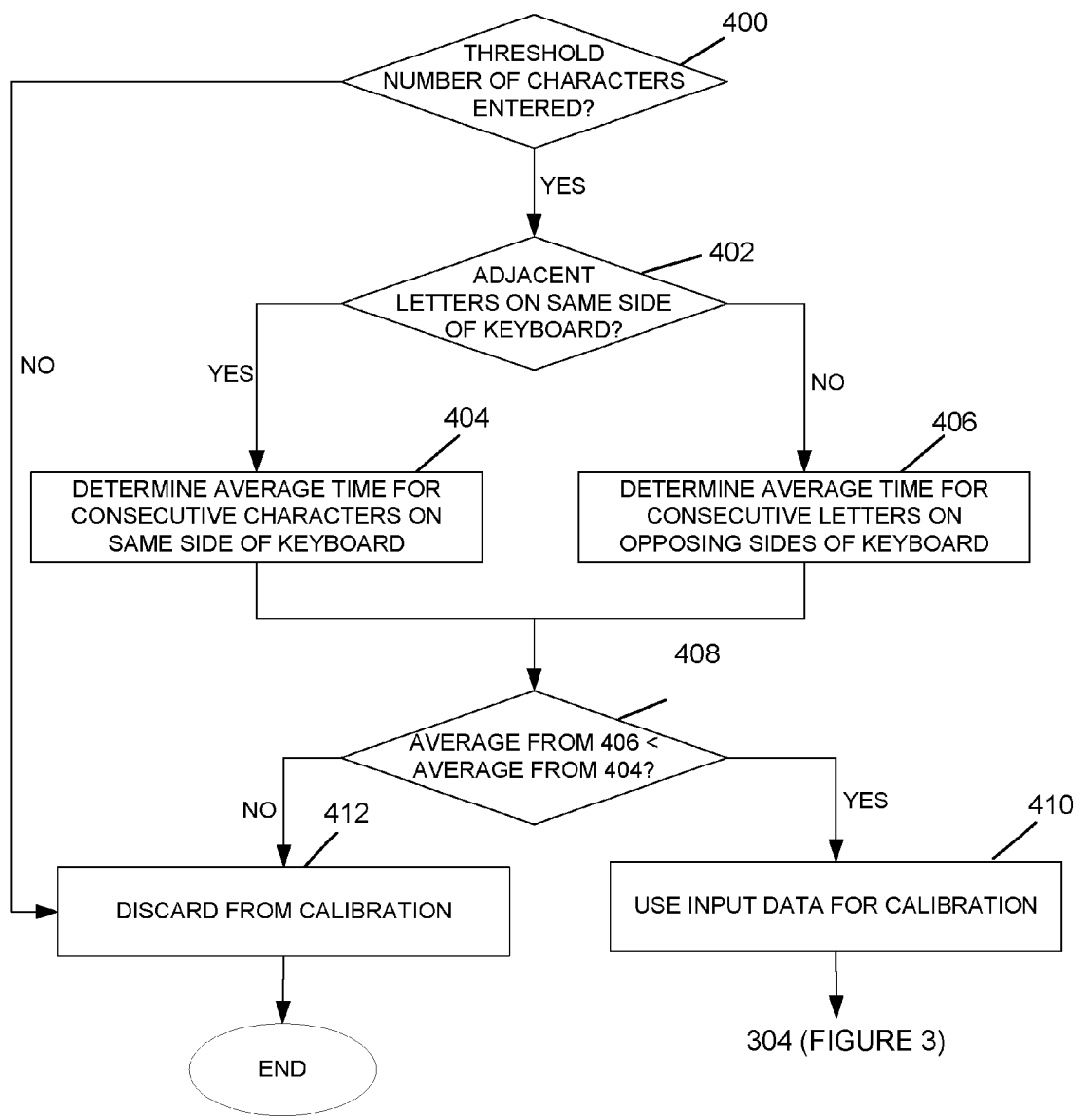
FIG. 4 is a flow chart illustrating substeps in an example of the method of calibrating the touch screen display of FIG. 3.

Reference is made to FIG. 3 and to FIG. 4 to describe one example of a method of calibrating the touch screen display 118. As described above, user input is received 300 at the processor 102 via the touch-sensitive overlay 114 and the controller 116. During receipt of the input, data relating to characteristics during receipt of the input is gathered. The user input is in the form of characters, such as letters, numbers, symbols, and so forth, typed on a virtual keyboard, such as the virtual keyboard 202 shown in FIG. 2. The input is received during typing in any suitable application such as a message application or any other suitable application, such as a calendar application or an address book/contacts application. In this example, the time from selection of a character to time of the selection of the next character during typing is determined. For each character entered, a side of the virtual keyboard 202 on which the character is located is also determined. A determination is made as to whether the character is located on the left side of the virtual keyboard 202 or the right side of the virtual keyboard 202. Upon completion of the user input, the input is filtered at step 302. The completion of entry of characters may be determined in any suitable manner such as, for example, the receipt of a send command for a message typed in the messages application 64 or receipt of any other suitable input.

Reference is made to FIG. 4 to describe one example of substeps in the method of calibrating the touch screen display 118 for determining whether or not to use the input received at step 300, thereby filtering the input for calibration. In this example, the number of characters entered at step 300 is compared to a suitable threshold number. If the number of characters entered does not meet or exceed the threshold number, the input and data gathered during input is discarded 412 and thus not used for calibration. If, on the other hand, the number of characters meets or exceeds the threshold number, the process continues with step 402.

At step 402, a determination is made as to whether characters entered consecutively during typing are located on the same side of the virtual keyboard 202 or on opposite sides of the virtual keyboard 202. If the characters entered consecutively are located on the same side of the virtual keyboard 202, the time between entry of the characters is included when determining 404 an average time for entry of characters on the same side of the virtual keyboard 202. Otherwise, the time between entry of the characters is included when determining 406 an average time for entry of characters on opposing sides of the virtual keyboard 202.

At step 408, the average time for consecutive entry of characters on the same side of the virtual keyboard 202, as determined at step 404, is compared to the average time for consecutive entry of characters on opposing sides of the virtual keyboard 202, as determined at step 406. If the average time for entry of characters on opposing sides of the virtual keyboard 202 is less than the average time for entry of characters on the same side of the virtual keyboard 202, the input is used for calibration at step 410 and the process continues with step 304. When the average time for consecutively typing characters on the same side of the virtual keyboard 202 is greater than the average time for consecutively typing characters on opposing sides of the virtual keyboard 202, the user is likely typing with both thumbs. If, on the other hand, the average time for entry of characters on opposing sides of the virtual keyboard 202 is not less than the average time for entry of characters on the same side of the virtual keyboard 202, the input is discarded 412 and thus not used for calibration and the process ends.

After the input is used for calibration at step 410, the method continues with step 304, where, for each character entered, the difference between the registered touch location and center of the target touch location for each of the user selections is determined. The difference in the present example includes the horizontal component and vertical component (or X-axis and Y-axis) differences between the between the registered touch location and center of each respective target key of the virtual keyboard 202 in the orientation in which the portable electronic device 100 is held during selection of characters from the virtual keyboard 202.

The appropriate X-axis and Y-axis offsets may be predetermined based on, for example, the difference between the center of the target touch location and the registered touch location when the portable electronic device 100 is calibrated, for example, when the portable electronic device 100 is new. Alternative methods for determining offsets are possible based on a comparison of input from the left and right thumbs for an X-axis component and based on a comparison of entries on keyboards in the portrait and landscape orientations for a Y-axis component.

An appropriate X-axis offset is subtracted 306 from each of the X-axis differences to provide a remainder of each difference that is attributed to the shift. Because the user is using both thumbs to type, as determined at step 302, the offsets differ depending on which thumb (right or left) is used for the respective entry. The thumb (right or left) used for typing is determined based on the difference determined at step 304. If the center of the target touch location is toward the top and the left compared to the location of touch registered by the touch screen display 118, the user is likely touching the touch screen display 122 with the right thumb. Similarly, if the center of the target touch location is toward the top and the right compared to the location of touch registered by the touch screen display 118, the user is likely touching the touch screen display 122 with the left thumb. Therefore, to subtract the correct offset, the difference between the center of the target touch location and the location of touch registered by the touch screen display 118 is used to determine a vector direction, which, in turn, is used to determine which offset to use (right or left) when subtracting the appropriate offset from the difference. For an input from a left thumb touch, each X-axis component of the difference between the center of the target touch location and the location of touch registered by the touch screen display 118 is subtracted by a left thumb offset. Similarly, for an input from a right thumb touch, each X-axis component of the difference between the center of the target touch location and the location of touch registered by the touch screen display 118 is subtracted by a right thumb offset. The X-axis offset for the left thumb may be generally equal and opposite in direction to the offset for the right thumb.

A Y-axis offset is also subtracted 306 from each of the Y-axis differences to provide a remainder of each difference that is attributed to the shift. In this example, the Y-axis component of the difference between the center of the target touch location and the location of touch registered by the touch screen display 118 is generally the same for each thumb. Therefore, all of the Y-axis component differences are subtracted by the same offset.

The X-axis and Y-axis remainders for each of the characters entered are optionally graphed 308 to provide an X-axis distribution curve of remainders and a Y-axis distribution curve of remainders. A mean value is determined from each of the distribution curves and the calibration is adjusted 310 in both the X and the Y direction by the respective mean of the remainders taken from the curves. Thus, the calibration is adjusted in both the horizontal and the vertical directions based on the mean remainder taken from the curves.

In the above example, the user input is filtered to determine if the input is to be used for calibration. The input is filtered based on whether or not a threshold number of characters is entered to use a representative number of characters. The input is further filtered based on whether or not the user is typing with one hand or with two hands. In the event that the user is typing with one hand, the time between typing of characters on opposing sides of the virtual keyboard 202 shown in FIG. 2 is likely greater than the time between typing of characters on the same side of the virtual keyboard 202. Further, if the average time for consecutively typing characters on the same side of the virtual keyboard 202 is greater than the average time for consecutively typing characters on opposing sides of the virtual keyboard 202, the user is likely typing with both thumbs.

Reference is now made to FIG. 5 to describe another embodiment. The landscape mode virtual keyboard shown in FIG. 2 is provided when the portable electronic device 100 is held in the landscape orientation. The portable electronic device 100 provides a portrait orientation keyboard 500, as shown in FIG. 5 when the portable electronic device 100 is held in the portrait orientation. In one embodiment, the calibration may be adjusted in the vertical direction in the portrait orientation shown in FIG. 5. Thus, the calibration is adjusted in one dimension based on user input from the portrait orientation keyboard and in the other dimension based on user input from the landscape orientation keyboard.

The keyboard shown in FIG. 5 is a reduced keyboard, where accurate prediction of whether the user is typing with both hands or with one hand may be difficult depending on the virtual keyboard provided and the dimensions of the portable electronic device 100. In this example, the input may be used only for vertical or Y component calibration, the Y-component in this case being in the portrait orientation, which is the X component in the landscape orientation. A threshold number of characters are entered for use in calibration. Thus, a large number of entries may be used in calibration to increase the reliability of the data in determining calibration errors. In this example, however, the time between consecutive entries of characters is not considered. Each Y-component of the difference between the center of the target touch location and the location of touch registered by the touch screen display 118 is reduced by a Y-component offset to leave a remainder that is generally attributed to the shift in calibration. The remainder of the difference, which is attributed to the shift, is optionally graphed to provide a Y-axis distribution curve. A mean remainder is taken from the distribution curve. While a mean remainder is referred to in the present example, any suitable average or other number based on the remainders or based on the average of the remainders, may be used to correct the calibration.

Figure 6:
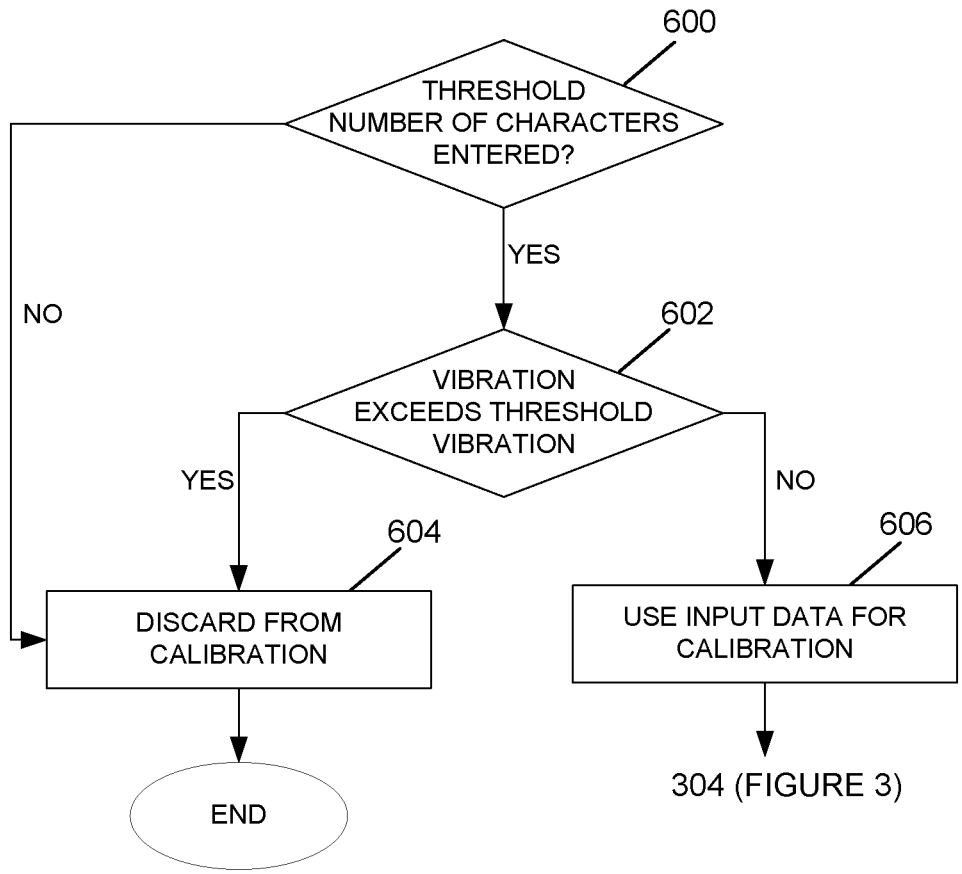
FIG. 6 is a flow chart illustrating substeps in another example of the method of calibrating the touch screen display of FIG. 3.

Reference is made to FIG. 3 and FIG. 6 to describe another example of a method of calibrating the touch screen display 118. As described, user input is received 300 at the processor 102 via the touch-sensitive overlay 114 and the controller 116. During receipt of the input, data relating to characteristics during receipt of the input is gathered. The user input is in the form of characters typed on a virtual keyboard, such as the virtual keyboard 202 shown in FIG. 2. The input is received during typing in any suitable application such as a message application or any other suitable application, such as a calendar application or an address book/contacts application. In this example, vibration of the portable electronic device 100 is measured via the accelerometer 136 during selection of the characters. Upon completion of the user input, i.e., when a sufficient number of characters are entered, the input is filtered at step 302.

Reference is made to FIG. 6 to describe another example of substeps in the method of calibrating the touch screen display 118 for determining whether or not to use the input received at step 300 and thereby filtering the input for calibration. In the present example, the number of characters entered at step 300 is compared 600 to a suitable threshold number. If the number of characters entered does not meet or exceed the threshold number, the input and data gathered during input is discarded 605 and thus not used for calibration and the process ends. If, on the other hand, the number of characters meets or exceeds the threshold number, the process continues with step 602.

At step 602, a determination is made if the vibration measured during receipt of the user input exceeds a threshold vibration. In this example, the threshold vibration may be a maximum or peak vibration. If the vibration measured during receipt of the user input does not exceed the threshold, the input is used 606 for calibration and the process continues with step 304. If, on the other hand, the vibration exceeds the threshold, the input is discarded 604 and thus not used for calibration and the process ends.

After the input is used for calibration at step 410, the method continues with step 304, where, for each character entered, the difference between the registered touch location on the touch screen display 118 and the center of each target is determined 304. The difference in the present example is the vertical component of the difference (or Y-axis difference) between the registered touch location (or touch location as measured) and the centre of each target key of the virtual keyboard 202 in the orientation in which the portable electronic device 100 is held during selection of characters from the virtual keyboard 202. A vertical or Y-axis offset is subtracted 306 from each difference determined, and the remainder of the difference, which is attributed to the shift, is optionally graphed 308 to provide a distribution curve of remainders. An average value, such as a mean value, is determined from the distribution curve and the calibration is adjusted 310 by an amount based on the average remainder taken from the curve. Thus, the calibration is adjusted in the vertical direction, in the orientation in which the device is held during typing, based on the average remainder taken from the curve.

As indicated above, the landscape mode virtual keyboard shown in FIG. 2 is provided when the portable electronic device 100 is held in the landscape orientation. The portable electronic device 100 provides a portrait orientation keyboard 500, as shown in FIG. 5 when the portable electronic device 100 is held in the portrait orientation. In this example, the calibration is adjusted in the vertical direction in the orientation in which the virtual keyboard is rendered during user input. The calibration is adjusted in the other direction, by similarly adjusting the calibration based on user input when the portable electronic device is held in the other orientation. Thus, the calibration is adjusted in one dimension based on user input from the landscape orientation keyboard and in the other dimension based on user input from the portrait orientation keyboard. The calibration is thereby adjusted in both dimensions (X and Y) by adjusting based on the vertical component of the difference between the center of the target touch location and the location of touch registered by the touch screen display 118, after subtracting the vertical offset, for each of the portrait orientation and the landscape orientation.

In this example, a threshold number of characters are entered for use in calibration. Thus, a large number of entries may be used in calibration to increase the reliability of the data, the data comprising the differences between the location of touch that is registered and the respective target touch locations, in determining calibration errors. Further, the difference data from the input is not used for calibration if the vibration measured exceeds a suitable threshold. Thus, if the user is typing while walking or while riding in a car, the difference data may not be used, thereby increasing reliability of the difference data used in calibration.

The methods shown and described with reference to FIGS. 3, 4, and 6 are simplified for the purpose of the present explanation and other steps and substeps may be included. Further, the determination of whether to use the input data for calibration may be made based on any suitable factors or a combination of suitable factors including a number of characters entered, time between entry of characters and vibration.

A method of calibrating a touch screen display at an electronic device is provided. The method includes receiving input comprising selections of features registered at the touch screen display, filtering the input based on characteristics determined during the receiving to determine if the input is to be used for calibrating, for each input used for calibrating, determining a difference between registered touch location and a respective target for the selection and subtracting an offset from the difference, thereby providing remainders of differences for the selections, and calibrating by adjusting a prior calibration based on the remainders if a determination is made that the input is to be used for calibrating.

An average remainder may be determined and calibrating may include adjusting the prior calibration based on the average remainder.

According to another aspect, there is provided an electronic device that includes a housing, a touch screen display including a display device and a touch-sensitive overlay exposed by the housing, and functional components in the housing. The functional components include a memory and a processor operably connected to the display device, the touch-sensitive overlay and the memory for executing a program stored in the memory to cause the electronic device to receive input comprising selections of features registered at the touch screen display, filter the input based on characteristics determined during the receiving to determine if the input is to be used for calibrating, for each input used for calibrating, determine a difference between registered touch location and a respective target for the selection and subtracting an offset from the difference, thereby providing remainders of differences for the selections, and calibrate by adjusting a prior calibration based on the remainders if the input is determined to be used for calibrating.

According to yet another aspect, there is provided a computer-readable medium having computer-readable code embodied therein for execution by a processor in an electronic device having a touch screen display, for receiving input comprising selections of features registered at the touch screen display, filtering the input based on characteristics determined during the receiving to determine if the input is to be used for calibrating, for each input used for calibrating, determining a difference between registered touch location and a respective target for the selection and subtracting an offset from the difference, thereby providing remainders of differences for the selections, and calibrating by adjusting a prior calibration based on the remainders if the input is determined to be used for calibrating.

Advantageously, the calibration of the electronic device is carried out during normal use of the device, for example during typing on a virtual keyboard. Thus, calibration may be carried out during typing, for example, of electronic mail or in any other suitable application. Further, the calibration may be continually carried out without repeating a tedious calibration routine. Further still, calibration may be carried out automatically rather waiting for the user to determine a drift in the calibration and execute a calibration routine. This increases accuracy of selection of virtual features during use of the device and may save device use time, thereby increasing battery life between charging.

The user input during use of the device is filtered out to reduce the chance of using data that is not likely to be reliable in determining calibration errors. Further, a large number of user inputs may be used in calibration as a large quantity of data is more likely to be reliable in determining calibration errors. The difference between registered touch location and target touch location for each of the user inputs used is reduced by an offset and the remainder may be mapped to a distribution curve. An average of the remainders may be used for calibration.

While the embodiments described herein are directed to particular implementations of the portable electronic device and the method of controlling the portable electronic device, modifications and variations may occur to those skilled in the art. All such modifications and variations are believed to be within the sphere and scope of the present disclosure. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    receiving input comprising selections of one or more keys of a virtual keyboard on a touch screen display of an electronic device, wherein the virtual keyboard has a first side and a second side opposing the first side;
measuring a time between consecutive selections of one key on the first side and one key on the second side, yielding an opposite-side consecutive- selection time;
measuring a time between consecutive selections of a first key and a second key on the first side and a time between consecutive selections of a third key and a fourth key on the second side, yielding a plurality of same-side consecutive-selection times;
when an average time of a plurality of opposite-side consecutive-selection times is less than an average of the same-side consecutive-selection times, utilizing the input for calibrating;
when the input is utilized for calibrating, determining differences between touch locations and associated targets for the selections and subtracting an offset from the differences, thereby providing remainders of differences for the selections; and
calibrating by adjusting a prior calibration based on the remainders when the input is utilized for calibrating.

2. The method according to claim 1, comprising determining an average of the remainders and wherein calibrating comprises adjusting the prior calibration based on the average of the remainders.

3. The method according to claim 2, wherein determining an average of the remainders comprises graphing the remainders to provide a distribution curve and determining a mean remainder from the distribution curve.

4. The method according to claim 1, wherein receiving input comprises receiving selections of characters during typing on a virtual keyboard at the electronic device.

5. The method according to claim 1, wherein determining differences comprises determining differences in one dimension and calibrating comprises adjusting the prior calibration by the average remainder in the one dimension.

6. The method according to claim 4, wherein determining differences comprises determining differences in a vertical dimension in the orientation of the electronic device during typing on the virtual keyboard.

7. The method according to claim 1, comprising filtering the input based on signals from an accelerometer.

8. The method according to claim 1, comprising filtering the input based on measured vibration at the electronic device during the receiving.

9. The method according to claim 1, comprising calibrating when a threshold number of selections are received.

10. An electronic device comprising:
a housing;
a touch screen display; and
a processor configured to cause the electronic device to:
receive input comprising selections of one or more keys of a virtual keyboard on the touch screen display, wherein the virtual keyboard has a first side and a second side opposing the first side,
measure a time between consecutive selections of one key on the first side and one key on the second side, yielding an opposite-side consecutive-selection time,
measure a time between consecutive selections of a first key and a second key on the first side and a time between consecutive selections of a third key and a fourth key on the second side, yielding a plurality of same-side consecutive-selection times;

when an average time of a plurality of opposite-side consecutive-selection times is less than an average of the same-side consecutive-selection times, utilize the input for calibrating,
when an input is utilized for calibrating, determine differences between touch locations and associated targets for the selections and subtracting an offset from the differences, thereby providing remainders of differences for the selections, and
calibrate by adjusting a prior calibration based on the remainders when the input is utilized for calibrating.

11. A non-transitory computer-readable medium having computer-readable code embodied therein for execution by a processor in an electronic device having a touch screen display, to receive input comprising selections of one or more keys of a virtual keyboard on the touch screen display, wherein the virtual keyboard has a first side and a second side opposing the first side, measure time between consecutive selections of one key on the first side and one key on the second side, yielding an opposite-side consecutive-selection time, measure a time between consecutive selections of a first key and a second key on the first side and a time between consecutive selections of a third key and a fourth key on the second side, yielding a plurality of same-side consecutive-selection times, when an average time of a plurality of opposite-side consecutive-selection times is less than an average of the same-side consecutive-selection times, utilize the input calibrating, when the input is utilized for calibrating, determine differences between touch locations and associated targets for the selections and subtracting an offset from the differences, thereby providing remainders of differences for the selections, and calibrate by adjusting a prior calibration based on the remainders when the input is utilized for calibrating.

12. The electronic device according to claim 10, wherein the differences comprises differences in one dimension and the remainders comprise an average remainder in the one dimension.

13. The electronic device according to claim 10, comprising an accelerometer coupled to the processor, wherein the input is filtered based on signals from an accelerometer.

14. The electronic device according to claim 10, wherein the input is filtered by determining if a threshold number of selections are received.

15. A method comprising:
receiving input comprising selections of characters of a virtual keyboard displayed on a touch-sensitive display of an electronic device;
measuring time between a first selection of a first character and a second selection of a second character;
when an average time between consecutive selections of characters on opposing sides of the virtual keyboard is less than an average time between consecutive selections of characters on a same side of the virtual keyboard, utilizing the input for calibrating by determining differences between touch locations and associated targets for the selections and subtracting an offset from the differences, thereby providing remainders of differences for the selections; and
calibrating by adjusting a prior calibration based on the remainders when the input is utilized for calibrating.

* * * * *